(12) United States Patent
Kim

(10) Patent No.: US 9,690,104 B2
(45) Date of Patent: Jun. 27, 2017

(54) AUGMENTED REALITY HUD DISPLAY METHOD AND DEVICE FOR VEHICLE

(71) Applicant: Hyundai Motor Company, Seoul (KR)

(72) Inventor: Sung Un Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/846,781

(22) Filed: Sep. 6, 2015

(65) Prior Publication Data

US 2016/0163108 A1 Jun. 9, 2016

(30) Foreign Application Priority Data

Dec. 8, 2014 (KR) .......................... 10-2014-0175097
May 12, 2015 (KR) .......................... 10-2015-0065842

(51) Int. Cl.
*G02B 27/01* (2006.01)
*G06F 3/01* (2006.01)
(Continued)

(52) U.S. Cl.
CPC ..... *G02B 27/0179* (2013.01); *G02B 27/0093* (2013.01); *G02B 27/01* (2013.01);
(Continued)

(58) Field of Classification Search
None
See application file for complete search history.

(56) References Cited

U.S. PATENT DOCUMENTS 7,706,978 B2 * 4/2010 Schiffmann ........... G01S 7/4026
340/436

2013/0169679 A1 * 7/2013 Su .......................... G02B 27/01
345/633
(Continued)

FOREIGN PATENT DOCUMENTS

| KR | 10-2012-0066472 A | 6/2012 |
| KR | 10-2012-0067854 A | 6/2012 |
| KR | 2013-0089139 A | 8/2013 |

*Primary Examiner* — Jwalant Amin
(74) *Attorney, Agent, or Firm* — Mintz Levin Cohn Ferris Glovsky and Popeo, P.C.; Peter F. Corless

(57) ABSTRACT

An augmented reality head-up display (HUD) display method for a vehicle includes: detecting a position of an object outside of the vehicle at which a driver of the vehicle is looking; detecting a position of an eye of the driver while the driver is viewing external object information displayed on a windshield of the vehicle; extracting augmented reality HUD display coordinates of the object based on the detected object position and augmented reality HUD display coordinates of the eye based on the detected eye position; correcting one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye, the error correction parameters varying from one another; receiving the corrected augmented reality HUD display coordinates of the object and the corrected augmented reality HUD display coordinates of the eye; and displaying augmented reality HUD graphics of the external object information on the windshield based on the received corrected augmented reality HUD display coordinates.

15 Claims, 11 Drawing Sheets

(51) Int. Cl.
*G02B 27/00* (2006.01)
*G06F 3/0481* (2013.01)
*G01S 7/04* (2006.01)
*G01S 13/93* (2006.01)

(52) U.S. Cl.
CPC ......... *G02B 27/0101* (2013.01); *G06F 3/013* (2013.01); *G06F 3/04815* (2013.01); *G01S 7/04* (2013.01); *G01S 13/931* (2013.01); *G02B 2027/014* (2013.01); *G02B 2027/0138* (2013.01); *G02B 2027/0187* (2013.01)

(56) References Cited

U.S. PATENT DOCUMENTS

| | | | |
|---|---|---|---|
| 2013/0315446 A1 | 11/2013 | Ben Tzvi | |
| 2014/0070934 A1* | 3/2014 | Chau | B60R 1/00 340/438 |
| 2014/0160012 A1* | 6/2014 | Su | G06F 3/005 345/156 |
| 2016/0216521 A1* | 7/2016 | Yachida | B60K 35/00 |

* cited by examiner

AUGMENTED REALITY HUD DISPLAY METHOD AND DEVICE FOR VEHICLE

CROSS-REFERENCE TO RELATED APPLICATIONS

This application claims priority to and the benefit of Korean Patent Application No. 10-2014-0175097 filed in the Korean Intellectual Property Office on Dec. 8, 2014 and Korean Patent Application No. 10-2015-0065842 filed in the Korean Intellectual Property Office on May 12, 2015, the entire contents of which are incorporated herein by reference.

BACKGROUND OF THE DISCLOSURE (a) Technical Field

The present disclosure relates generally to an augmented reality head-up display (HUD)-related technology for vehicles, and more particularly, to an augmented reality HUD display method and device for a vehicle which can minimize perception errors in augmented reality HUD graphics on a HUD.

(b) Description of the Related Art

Head-up displays (HUDs) are often used in automobiles for projecting information to a driver's eyes. A HUD is a front display device that is designed to present vehicle driving information on a front window (i.e., windshield) of a vehicle. In other words, a HUD unit produces and displays virtual images to allow the driver to view various types of information, such as speed, fuel level, temperature, warnings, directions, etc., which have been conventionally displayed on a vehicle's instrument cluster.

HUDs were originally introduced for providing a pilot with an enhanced field of view in an aircraft. Now, HUDs are beginning to be implemented in vehicles for the purpose of displaying driving information and reducing accidents caused by drivers looking away from the road while driving. For instance, through the use of a head-up display unit, drivers can keep their attention focused ahead (i.e., toward the road), thereby reducing the risk of accidents. Certain HUD units also offer a night vision feature that allows drivers to identify objects ahead in darkness, as well as displaying information deriving from the instrument cluster.

Accordingly, a HUD may be a device that presents information without requiring drivers to divert their attention from the road ahead while driving, by displaying images of information about the operation of a vehicle. Often, the HUD is implemented through a screen film inserted in the windshield at the front so as to minimize the driver's eye movement. Such a HUD may be comprised of an image source (e.g., a liquid crystal display (LCD)) for generating images, an optical system for forming an image generated by and projected from the image source, and an interface for the driver's control. The image should be projected from the image source at an optimum distance from the windshield and at an effective focal length.

A HUD for vehicles can display information deriving from the instrument panel cluster, such as vehicle speed, mileage, revolutions per minute (RPM), etc. on the front windshield so that the driver is able to get driving information easily while driving. Also, the HUD displays virtual images on the windshield by rendering information on a variety of internal systems of the vehicle into images when the vehicle is brought to a halt or the driver shifts the vehicle from park.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The present disclosure has been made in an effort to provide an augmented reality HUD display method and device for a vehicle which can minimize perception errors in augmented reality HUD graphics, perceived by the vehicle driver or user.

Embodiments of the present disclosure provide an augmented reality HUD display method for a vehicle that includes: detecting a position of an object outside of the vehicle at which a driver of the vehicle is looking; detecting a position of an eye of the driver while the driver is viewing external object information displayed on a windshield of the vehicle; extracting augmented reality HUD display coordinates of the object based on the detected object position and augmented reality HUD display coordinates of the eye based on the detected eye position; correcting one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye, the error correction parameters varying from one another; receiving the corrected augmented reality HUD display coordinates of the object and the corrected augmented reality HUD display coordinates of the eye; and displaying augmented reality HUD graphics of the external object information on the windshield based on the received corrected augmented reality HUD display coordinates.

The correcting of the one or more errors may include: detecting a position of a plurality of objects outside of the vehicle; setting a first correction parameter for correcting one or more errors in augmented reality HUD display coordinates of a first object of the plurality of objects and one or more errors in the augmented reality HUD display coordinates of the eye while the driver is viewing the first object; and setting a second correction parameter for correcting one or more errors in augmented reality HUD display coordinates of a second object of the plurality of objects and the augmented reality HUD display coordinates of the eye while the driver is viewing the second object. The first object may be an external object that is a first distance away from the eye of the driver, the second object may be an external object that is a second distance away from the eye of the driver that is shorter than the first distance, and the second correction parameter may be set to a lower error correction value than the first correction parameter.

The method may further include detecting the position of the object using a radar sensor or a lidar sensor. The method may also further include detecting the position of the eye using a camera.

The correcting of the one or more errors may include: low-pass filtering the one or more errors in the augmented reality HUD display coordinates of the object and the one or more errors in the augmented reality HUD display coordinates of the eye. A cut-off frequency given as a first correction parameter for the low-pass filtering may be lower than a cut-off frequency given as a second correction parameter for the low-pass filtering.

HUD display information corresponding to the external object information may include speed information of the object or navigation information of the object. The navigation information may include turn-by-turn (TBT) information.

Furthermore, according to embodiments of the present disclosure, an augmented reality HUD display device for a vehicle includes: an object detection sensor detecting a position of an object outside of the vehicle at which a driver of the vehicle is looking; an eye position detector detecting a position of an eye of the driver while the driver is viewing external object information displayed on a windshield of the vehicle; an augmented reality display coordinates extractor extracting a augmented reality HUD display coordinates the object based on the detected object position and augmented reality HUD display coordinates of the eye based on the detected eye position; an error correction module correcting one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye, the error correction parameters varying from one another; and a graphics display unit receiving, from the error correction module, the corrected augmented reality HUD display coordinates of the object and the corrected augmented reality HUD display coordinates of the eye and displaying augmented reality HUD graphics of the external object information on the windshield based on the received corrected augmented reality HUD display coordinates.

The object detection sensor may detect a position of a plurality of objects outside of the vehicle; and the error correction module may set a first correction parameter for correcting one or more errors in augmented reality HUD display coordinates of a first object of the plurality of objects and one or more errors in augmented reality HUD display coordinates of the eye while the driver is viewing the first object and a second correction parameter for correcting one or more errors in augmented reality HUD display coordinates of a second object of the plurality of objects and augmented reality HUD display coordinates of the eye while the driver is viewing the second object. The first object may be an external object that is a first distance away from the eye of the driver, the second object may be an external object that is a second distance away from the eye of the driver that is shorter than the first distance, and the second correction parameter may be set to a lower error correction value than the first correction parameter.

The object detection sensor may include a radar sensor or a lidar sensor. The eye position detector may include a camera.

The error correction module may include a low-pass filter, and a cut-off frequency given as a first correction parameter for the low-pass filter may be lower than a cut-off frequency given as a second correction parameter for the low-pass filter.

HUD display information corresponding to the external object information may include speed information of the object or navigation information of the object. The navigation information may include TBT information.

Furthermore, according to embodiments of the present disclosure, a non-transitory computer readable medium containing program instructions for an augmented reality HUD display method for a vehicle includes: program instructions that detect a position of an object outside of the vehicle at which a driver of the vehicle is looking; program instructions that detect a position of an eye of the driver while the driver is viewing external object information displayed on a windshield of the vehicle; program instructions that extract augmented reality HUD display coordinates of the object based on the detected object position and augmented reality HUD display coordinates of the eye based on the detected eye position; program instructions that correct one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye, the error correction parameters varying from one another; program instructions that receive the corrected augmented reality HUD display coordinates of the object and the corrected augmented reality HUD display coordinates of the eye; and program instructions that display augmented reality HUD graphics of the external object information on the windshield based on the received corrected augmented reality HUD display coordinates.

Accordingly, an augmented reality HUD display device and method for a vehicle allow the driver of a vehicle to intuitively perceive the real-world driving environment on an augmented reality HUD system (i.e., augmented reality HUD device) for the vehicle, by correcting graphics errors perceived by the driver in a way that varies with the distance to an object the driver is looking at. Furthermore, the present disclosure may realize an algorithm that costs very little to implement an augmented reality HUD display method for a vehicle by making a trade-off between sensor cost and sensor performance, even if sensor technology is expected to make quite a lot of progress.

BRIEF DESCRIPTION OF THE DRAWINGS

In order to fully understand the drawings used in the detailed description of the present disclosure, the respective drawings will be briefly described.

DETAILED DESCRIPTION OF THE EMBODIMENTS

Figure 1:
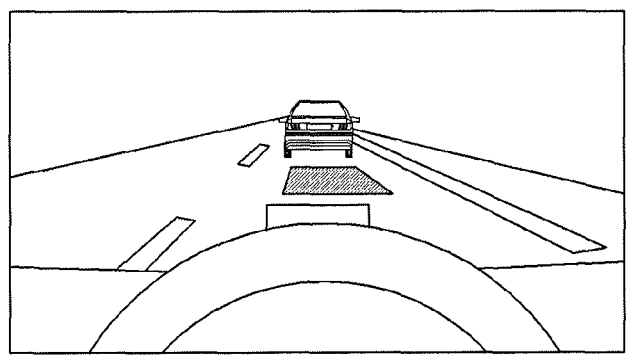
FIG. 1 and FIG. 2 are views showing examples of an augmented reality HUD display method.

For better understanding of the present disclosure, and to show more clearly how it may be carried into effect, reference will now be made, by way of examples, to the accompanying drawings which show embodiments of the present disclosure.

Hereinafter, embodiments of the present disclosure will be described in detail with reference to the accompanying drawings. In describing the embodiments of the present disclosure, a detailed description of pertinent known constructions or functions will be omitted if it is deemed to make the gist of the present disclosure unnecessarily vague. Wherever possible, the same reference numbers will be used throughout the drawings to refer to the same or like parts.

The terms used in the specification are used to describe only specific embodiments and are not intended to limit the present disclosure. Singular forms are intended to include plural forms unless the context clearly indicates otherwise. It will be further understood that the terms "include", "comprise", or "have" used in this specification specify the presence of stated features, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms have the same meaning as those that are understood by those who are skilled in the art. It must be understood that the terms defined by the dictionary are identical with the meanings within the context of the related art, and they should not be ideally or excessively formally defined unless the context clearly dictates otherwise.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 2:
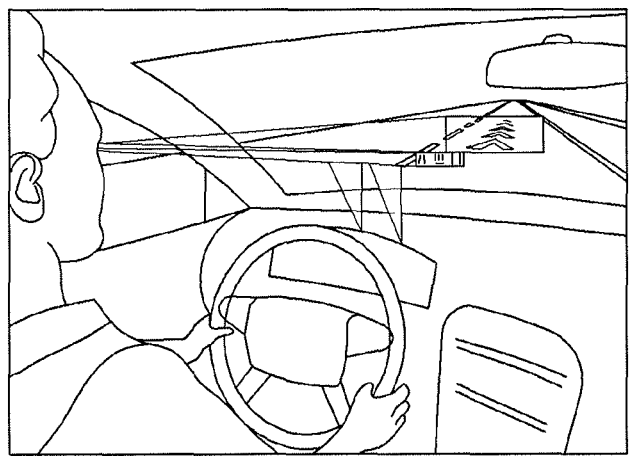

Generally, in order to realize an augmented reality HUD as shown in FIGS. 1 and 2, it is necessary to detect the vehicle driver's eye position and the coordinates of a target the driver intends to see. FIG. 1 and FIG. 2 are views showing examples of an augmented reality HUD display method.

Sensor data from a camera sensor for detecting the eye position, a lidar (light detection and ranging) sensor, and/or radar sensor for detecting objects outside the vehicle has a certain angle of error due to sensor vibration or eye blinks. Such an error involves a perception error that varies with the distance to a target object to be displayed on the augmented reality HUD, which will cause confusion for the vehicle driver or user. Particularly, the use of a distance-independent perception error reduction algorithm may lead to difficulty in keeping the performance of augmented reality HUD graphics consistent.

Figure 3:
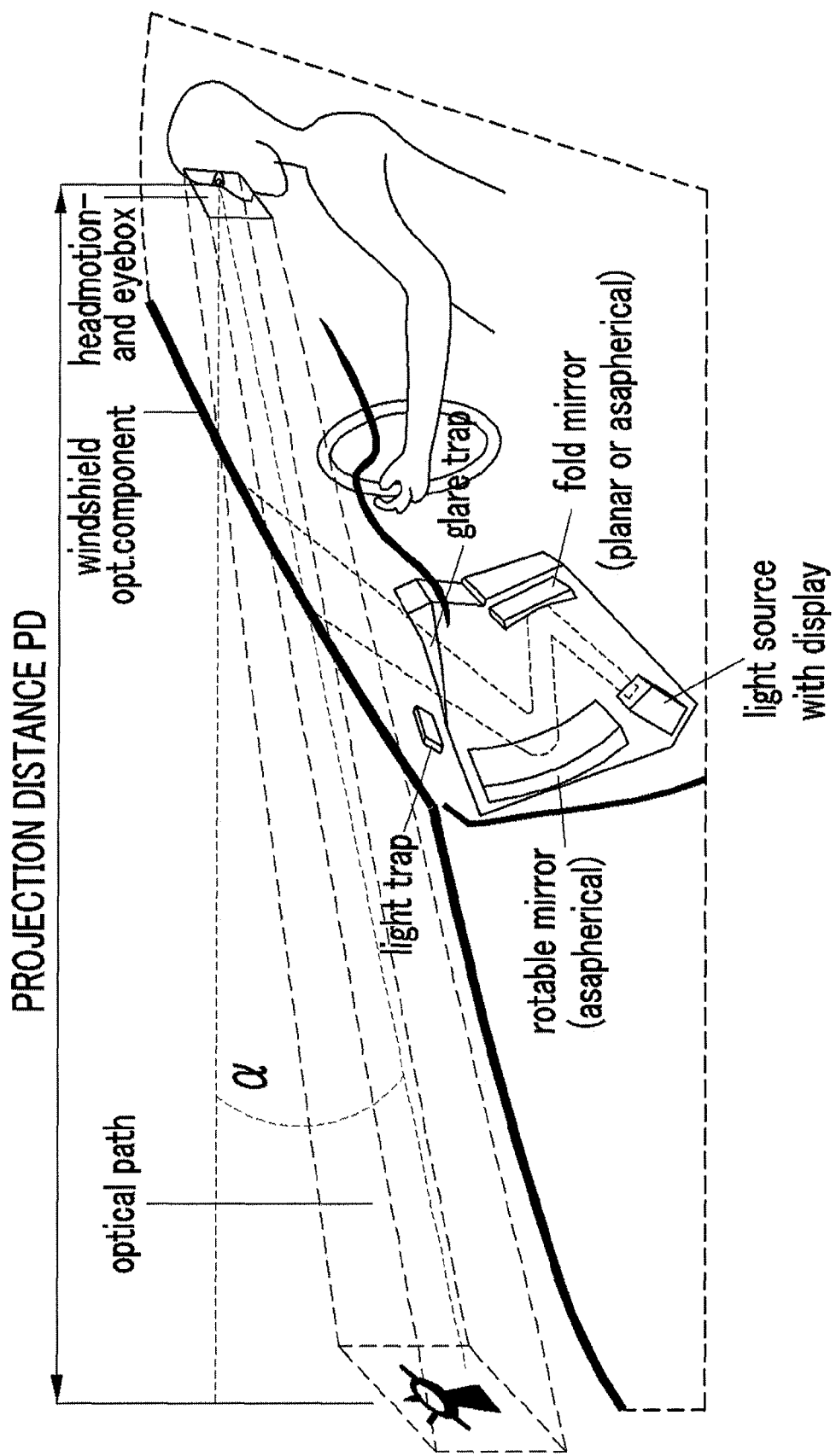
FIG. 3 is a view showing an example of the technical construction of an augmented reality HUD.

Further, in order to realize an augmented reality HUD in a vehicle as shown in FIG. 3, an image is projected on the windshield glass, and the user may see the projected image, as a virtual image, overlaid onto the real world beyond the windshield. FIG. 3 is a view showing an example of the technical construction of an augmented reality HUD.

To accurately match an obstacle or indicator (mark) ahead of the vehicle, the eye position of the driver of the vehicle must be detected, and the eye position is usually detected by a camera installed in the vehicle. The eye-tracking coordinates have some noise because of the camera resolution, eye blinks, etc., and a sensor for sensing external objects also has some coordinate error due to resolution issues.

Figure 4:
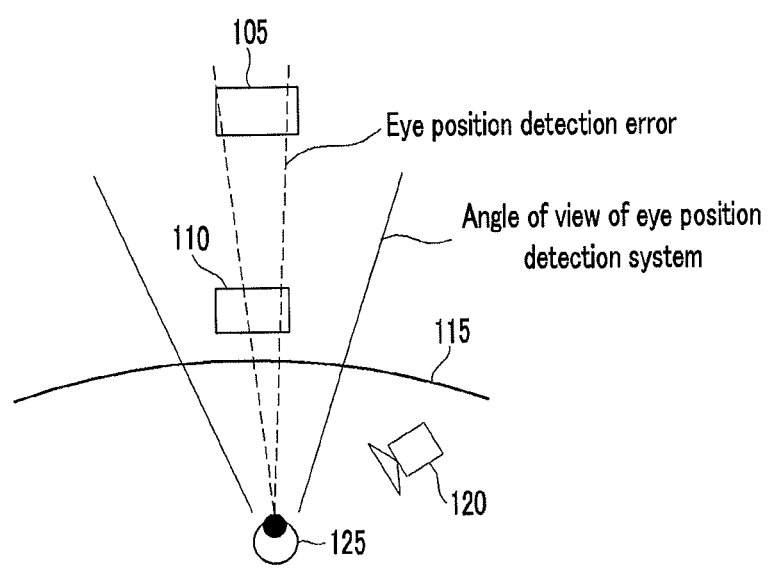
FIG. 4 is a view for explaining an eye position detection error and a driver's angle of view on an augmented reality HUD.

FIG. 4 is a view for explaining an eye position detection error and a driver's angle of view on an augmented reality HUD. Specifically, FIG. 4 explains a display error on an object outside the vehicle the driver is looking at, caused by eye noise.

As shown in FIG. 4, the technical components of an augmented reality HUD may include an eye position detecting camera 120 for detecting the driver's eye, and a radar (radio detecting and ranging) sensor 205 and/or lidar (light detection and ranging) sensor for detecting (i.e., measuring) the position of an external object.

An eye vector can be indicated by a line connecting the center of the driver's eye 125 and the center of the pupil. Thus, the line of sight (i.e., angle of view of an eye position detection system) has a vector which radiates from the center of the eye, as shown in FIG. 4. As such, eye noise (i.e., eye position detection error) radiates (at a certain angle), and as shown in FIG. 4, the farther from the eye, the larger the margin of error in orthogonal coordinates in a transverse plane.

As further shown in FIG. 4, the margin of orthogonal error (i.e., orthogonal coordinate error) in the eye position varies with respect to distance (i.e., the distance from the driver's eye to an object the driver is looking at), even for an object of the same size. Thus, an augmented reality HUD graphic display of a far object 105 on the vehicle's windshield glass 115 has a larger margin of error than an augmented reality HUD graphic display of a near object 110 on it, thus leading to a higher level of perceived noise (i.e., perception error) on the far object.

Figure 5:
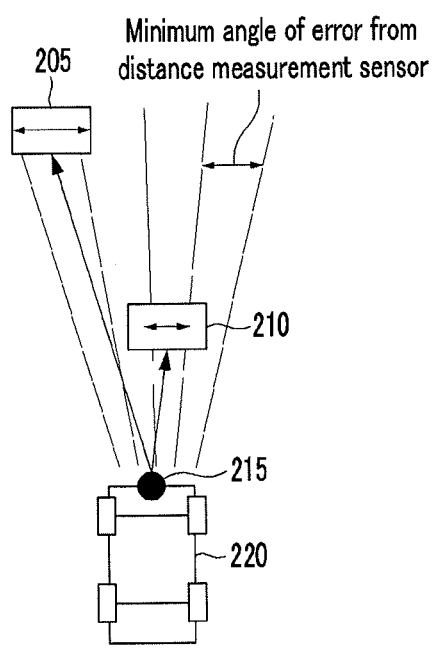
FIG. 5 is a view for explaining an error in the measurement of the distance to an object using a vehicle sensor.

FIG. 5 is a view for explaining an error in the measurement of the distance to an object using a vehicle sensor.

As shown in FIG. 5, the same principle as explained with reference to FIG. 4 may be applied to a sensor such as a radar sensor or lidar sensor 215 installed at the front of the vehicle 220. Radio waves or light (or laser light) radiation from the sensor 215 departs from one point on the vehicle 220 and scans the area ahead of the vehicle. Accordingly, sensing noise also radiates like the aforementioned eye noise, at a certain angle (i.e., angle of error from a distance measurement sensor).

Therefore, as shown in FIG. 5, sensing noise varies with the distance between the vehicle 220 and the far object 205 or near object 210 outside the vehicle 220. In an augmented reality HUD graphic representation of the variation of sensing noise with distance, the far object 205 of the same size as the near object 210 is displayed with a different level of graphics noise, causing the driver to perceive noise at different levels for the far object 205 and the near object 210.

Figure 6:
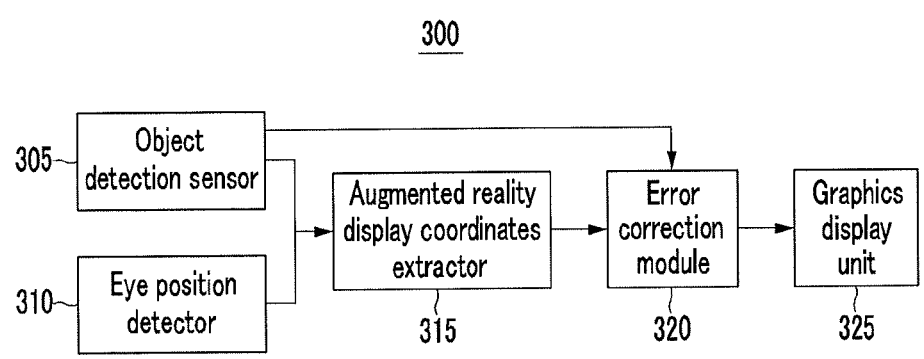
FIG. 6 is a block diagram for explaining an augmented reality HUD display device for a vehicle according to embodiments of the present disclosure.

Referring now to the disclosed embodiments, FIG. 6 is a block diagram for explaining an augmented reality HUD display device for a vehicle according to embodiments of the present disclosure.

As shown in FIG. 6, an augmented reality HUD display device 300 for a vehicle may include an object detection sensor 305, an eye position detector 310, an augmented reality display coordinates extractor 315, an error correction module 320, and a graphics display unit 325.

As is known in the art, augmented reality may refer to computer graphics technology that synthesizes a virtual object or virtual information within the real world to make it look like a real-world object. In other words, augmented reality may refer to virtual reality technology that combines virtual information with the real world as viewed through the eye to produce one image. The augmented reality technology is well known in the art, so a detailed description thereof will be omitted in this specification.

A head-up display (HUD) device such as the augmented reality HUD display device 300 for a vehicle may be a device that reflects an image onto a windshield of the vehicle or a combiner (i.e., transparent panel) to provide a vehicle driver with vehicle information such as vehicle speed, mileage, or revolution per minute (RPM), or navigation information. Since augmented reality HUDs require matching a real-world object with the eye position, depending on the eye position, the driver's eye position may have to be matched with an HUD screen (HUD area). The HUD area (i.e., HUD display area or HUD screen area) may indicate a vehicle information image area that is delivered to the vehicle driver's eye by presenting vehicle information such as vehicle driving information on the windshield of the vehicle. The HUD area may indicate a virtual area where an HUD image is displayed. The HUD area may refer to an area that is within a display screen which the driver's eye is on and which presents an image when the driver looks ahead.

The augmented reality HUD display device 300 for a vehicle may perform a process of correcting augmented reality graphics coordinates (i.e., augmented reality HUD graphic coordinates), and may perform a method of minimizing graphic errors caused by the vehicle driver's or user's shifting their eyes (i.e., graphic errors caused by eye movements) in the design of an augmented reality HUD graphics interface. More specifically, the augmented reality HUD display device 300 for a vehicle may execute an algorithm that gives more priority to response rate than to accuracy for an object near the vehicle and vice versa for an object, such as a building, far from the vehicle.

Moreover, the augmented reality HUD display device 300 for a vehicle may use error correction parameters that vary with the distance between the driver and an object to be displayed by the augmented reality HUD (i.e., the distance between the driver's eye and an object at which the driver is looking), in order to give consistent perception errors to the driver. Basically, it is better to reduce errors in all sensor data, but this may involve degradation of other properties. For example, low-pass filtering, one of the most typical methods of error reduction, can significantly reduce noise but may lead to a low response speed.

Accordingly, in order to give equal perception errors regardless of the distance between the driver and an object, error correction parameters are set in such a way that reduces the margin of error on the far object shown in FIG. 4 or FIG. 5 to a greater degree and reduces the margin of error on the near object to a lesser degree. This is because, while a low response speed on the far object causes no problem in the performance (i.e., display accuracy) of the augmented reality HUD display device 300 since long-distance movement of the far object is not presented to the driver, the near object has less noise for its size and response speed is more critical for the near object.

The object detection sensor 305 may detect the position of an object outside the vehicle the driver is looking at. The object detection sensor 305 may measure the distance from the vehicle to the external object. Moreover, the object detection sensor 305 may deliver distance information to the error correction module 320 that uses sensor data error correction parameters so as to use this information as a reference in the error correction of the error correction module 320.

The object detection sensor 305 may include a radar sensor and/or a lidar (Light Detection and Ranging) sensor. The lidar sensor, a type of laser radar sensor, may be a radar system that measures the coordinates of the position of a reflecting object by measuring the time for a laser pulse to be irradiated and reflected and return.

The eye position detector 310 may detect the eye position of the driver viewing external object information or augmented reality HUD display information corresponding to the external object information which is displayed on the windshield of the vehicle. The eye position detector 310 may include a camera.

The augmented reality display coordinates extractor (i.e., augmented reality HUD display coordinates extractor) 315 may extract the augmented reality HUD display coordinates of an external object detected by the object detection sensor 305 and the augmented reality HUD display coordinates (or eye-tracking coordinates) of the eye position detected by the eye position detector 310.

The error correction module 320 may correct errors in the augmented reality HUD display coordinates of the external object and errors in the augmented reality HUD display coordinates of the eye position by using an error correction parameter for the augmented reality HUD display coordinates of the external object and an error correction parameter for the augmented reality HUD display coordinates of the eye position, the error correction parameters varying with distance information between the driver's eye and the external object. The distance information may be delivered from the object detection sensor 305 to the error correction module 320.

The error correction module 320 may also set a first correction parameter for correcting errors in the augmented reality HUD display coordinates of first object and errors in the augmented reality HUD display coordinates of the eye position of the vehicle driver viewing the first object, and a second correction parameter for correcting errors in the augmented reality HUD display coordinates of second object and the augmented reality HUD display coordinates of the position of the eye viewing the second object. The first object is the external object that is at a first distance from the driver's eye, the second object is the external object that is at a second distance from the driver's eye which is shorter than the first distance, and the second correction parameter is set to a lower error correction value than the first correction parameter.

The augmented reality HUD display device 300 for a vehicle may further include a camera that captures an image of the road ahead of the vehicle that is matched with the external object information or the HUD display information (i.e., virtual image information). The image of the road ahead may be of a scene the driver is seeing through the windshield.

Additionally, the error correction module 320 may include a low-pass filter (LPF). A cut-off frequency given as a first correction parameter for the low-pass filter may be lower than a cut-off frequency given as a second correction parameter for the low-pass filter.

The graphics display unit 325 may receive, from the error correction module 320, the corrected augmented reality HUD display coordinates of the external object and the corrected augmented reality HUD display coordinates of the eye position, and display augmented reality HUD graphics of the external object information on the windshield. HUD display information corresponding to the external object information may include speed information of the external object shown in FIG. 10 or navigation information related to the external object. The navigation information may include turn-by-turn (TBT) information shown in FIG. 11. The TBT information may include a direction change icon.

Additionally, the augmented reality HUD display device 300 for a vehicle may further include a controller (not shown). The controller may perform the functions of a central processing unit (CPU) or processor and control the overall operation of the object detection sensor 305, eye position detector 310, augmented reality display coordinates extractor 315, error correction module 320, and graphics display unit 325. The controller may include a program containing a series of commands for performing an augmented reality HUD display method for a vehicle according to the present disclosure to be described later.

An augmented reality HUD display method for a vehicle according to embodiments of the present disclosure will now be described below with reference to FIG. 6. The augmented reality HUD display method for a vehicle may be applied to the augmented reality HUD display device 300 for a vehicle shown in FIG. 6, and may also be referred to as a method of displaying variable errors on an augmented reality HUD for a vehicle.

The augmented reality HUD display method for a vehicle may include, for example, a first detection step, a second detection step, an extraction step, a correction step, and a display step.

In the first detection step, the position of an object outside the vehicle the vehicle driver is looking at may be detected by the object detection sensor 305. The sensor for detecting the position of the external object may include a radar sensor or a lidar sensor.

In the second detection step, the eye position of the vehicle driver viewing external object information displayed on the windshield of the vehicle may be detected by the eye position detector 310. The sensor for detecting the eye position may include a camera. HUD display information corresponding to the external object information may include speed information of the external object shown in FIG. 10 or navigation information regarding the external object. The navigation information may include TBT information shown in FIG. 11.

In the extraction step, the augmented reality HUD display coordinates of the detected external object or the augmented reality HUD display coordinates (or eye-tracking coordinates) of the detected eye may be extracted by the augmented reality display coordinates extractor 315.

In the correction step, errors in the augmented reality HUD display coordinates of the external object and errors in the augmented reality HUD display coordinates of the eye position may be corrected by the error correction module 320 by using an error correction parameter for the augmented reality HUD display coordinates of the external object and an error correction parameter for the augmented reality HUD display coordinates of the eye position, the error correction parameters varying (i.e., changing) with distance information (i.e., eye distance information) between the driver's eye and the external object.

In the correction step, a first correction parameter for correcting errors in the augmented reality HUD display coordinates of first object and errors in the augmented reality HUD display coordinates of the eye position of the vehicle driver viewing the first object, and a second correction parameter for correcting errors in the augmented reality HUD display coordinates of second object and the augmented reality HUD display coordinates of the position of the eye viewing the second object may be set by the error correction module 320. The first object is the external object that is at a first distance from the driver's eye, the second object is the external object that is at a second distance from the driver's eye which is shorter than the first distance, and the second correction parameter is set to a lower error correction value than the first correction parameter.

Additionally, errors in the augmented reality HUD display coordinates of the external object and errors in the augmented reality HUD display coordinates of the eye position may be low-pass-filtered. A cut-off frequency given as a first correction parameter for the low-pass filtering may be lower than a cut-off frequency given as a second correction parameter for the low-pass filtering.

In the display step, the corrected augmented reality HUD display coordinates of the external object and the corrected augmented reality HUD display coordinates of the eye position may be received, and augmented reality HUD graphics of the external object information may be displayed on the windshield by the graphics display unit 325.

Figure 7:
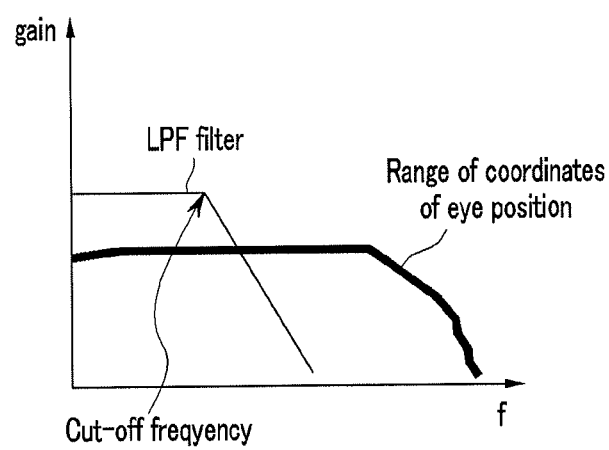
FIG. 7 is a graph for explaining an example of the error correction module of FIG. 6.

FIG. 7 is a graph for explaining an example of the error correction module of FIG. 6.

As shown in FIG. 7, if a low-pass filter (LPF) is applied to the error correction module 320 of FIG. 6, a cut-off frequency may be given as a correction parameter. Here, when an object is far from the driver (or vehicle), the cut-off frequency of the LPF may decrease, and when the object is near the driver (or vehicle), the cut-off frequency of the LPF may increase. The accuracy and response speed of sensor data may be adjusted by cut-off frequency adjustment.

More specifically, as shown in FIG. 7, errors in the augmented reality HUD display coordinates of the external object and errors in the augmented reality HUD display coordinates of the eye may be corrected by low-pass-filtering the range of coordinates of the eye position and the range of coordinates of the position of a detected object (not shown) extracted by the augmented reality display coordinates extractor (i.e., 315 of FIG. 6).

As described above, in embodiments of the present disclosure, the cut-off frequency of the LPF may be used as an error correction parameter, and the cut-off frequency may be adjusted depending on the distance between the driver (or vehicle) and an external object. As a result, the present disclosure can minimize perception errors in augmented reality HUD graphics in a HUD device, perceived by the driver.

Figure 8:
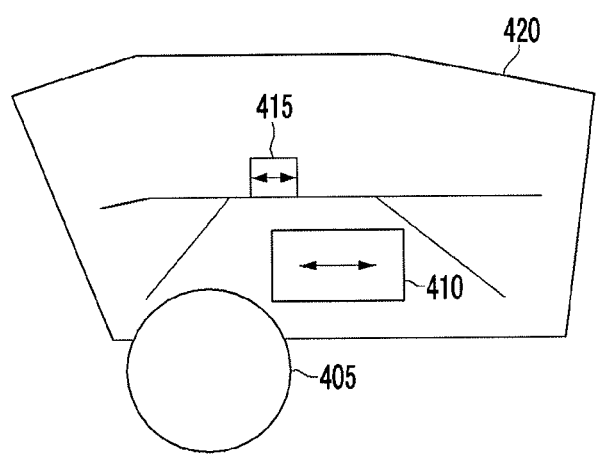
FIG. 8 is a view for explaining an example of augmented reality HUD graphics displayed by the augmented reality HUD display device for a vehicle shown in FIG. 6.

FIG. 8 is a view for explaining an example of augmented reality HUD graphics displayed by the augmented reality HUD display device for a vehicle shown in FIG. 6. FIG. 8 may show a graphical representation of perception errors on objects that vary with the distance from the driver's viewpoint in a real situation.

As shown in FIG. 8, a vehicle driver 405 may see a first object 415 at a long distance and a second object 410 at a short distance on the windshield 420, with variable errors obtained by correcting errors in graphic coordinates. The first object 415 corresponds to first HUD display information, and the second object 410 corresponds to second HUD display information.

Large-scale error correction may be performed on the first object 415, as indicated by the larger double-headed arrow of FIG. 8, and small-scale error correction may be performed on the second object 410, as indicated by the smaller double-headed arrow of FIG. 8. As a result, perception errors in graphics may be made equal regardless of the distance between the driver (or vehicle) and the objects, thereby minimizing distance-dependent cursor blinking on the displayed objects 410 and 415.

Figure 9:
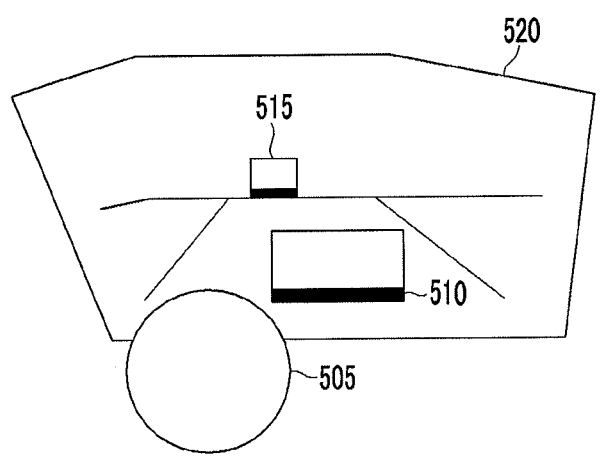
FIG. 9 is a view for explaining another example of augmented reality HUD graphics displayed by the augmented reality HUD display device for a vehicle shown in FIG. 6.

FIG. 9 is a view for explaining another example of augmented reality HUD graphics displayed by the augmented reality HUD display device for a vehicle shown in FIG. 6. That is, FIG. 9 shows an application of the present disclosure which displays the distance to a vehicle ahead on an augmented reality HUD.

As shown in FIG. 9, graphics of a near object 510, i.e. a second object, may be displayed, with the display error parameter set to correspond to response speed rather than accuracy, and graphics of a far object 515, i.e. a first object, may be displayed, with the display error parameter set to correspond to accuracy rather than response speed.

Accordingly, the vehicle driver 505 is able to see on the windshield 520 a graphic display of the near vehicle 510 and a graphic display of the far vehicle 515 where perception errors in graphics are equal regardless of the distance between the driver (or vehicle) and the objects.

Figure 10:
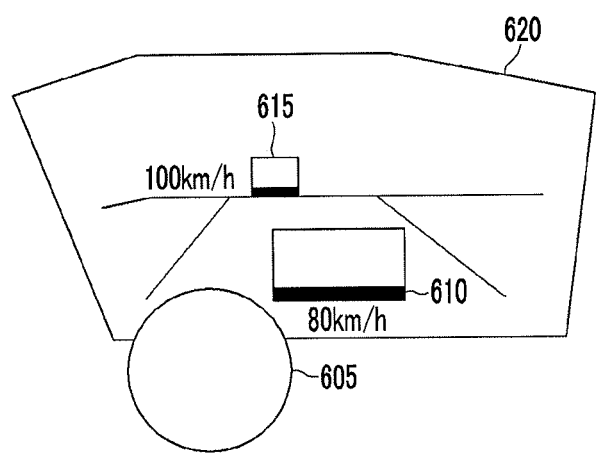
FIG. 10 is a view for explaining yet another example of augmented reality HUD graphics displayed by the augmented reality HUD display device for a vehicle shown in FIG. 6.

FIG. 10 is a view for explaining yet another example of augmented reality HUD graphics displayed by the augmented reality HUD display device for a vehicle shown in FIG. 6. In other words, FIG. 10 shows an application of the present disclosure which displays the speed of a vehicle ahead on an augmented reality HUD.

As shown in FIG. 10, graphics of a near object 610, i.e., a second object, may be displayed, with the display error parameter set to correspond to response speed rather than accuracy, and graphics of a far object 615, i.e., a first object, may be displayed, with the display error parameter set to correspond to accuracy rather than response speed. Accordingly, the vehicle driver 605 is able to see on the windshield 620 a graphic display of the near vehicle 610 and a graphic display of the far vehicle 615 where perception errors in graphics are equal regardless of the distance between the driver (or vehicle) and the objects.

Figure 11:
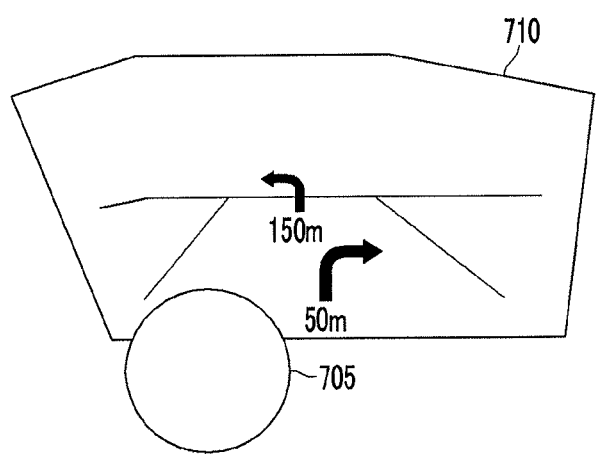
FIG. 11 is a view for explaining a further example of augmented reality HUD graphics displayed by the augmented reality HUD display device for a vehicle shown in FIG. 6.

FIG. 11 is a view for explaining a further example of augmented reality HUD graphics displayed by the augmented reality HUD display device for a vehicle shown in FIG. 6. That is, FIG. 11 shows an application of the present disclosure which displays TBT information on an augmented reality HUD.

As shown in FIG. 11, TBT information for a short distance (e.g., 50 m) may be displayed, with the coordinate error parameter set to correspond to response speed rather than accuracy, and TBT information for a long distance (e.g., 150 m) may be displayed, with the coordinate error parameter set to correspond to accuracy rather than response speed.

The components, units, blocks, or modules used in the present disclosure may be implemented by software components, such as tasks, classes, subroutines, processes, objects, execution threads, or programs, or by hardware components, such as a Field Programmable Gate Array (FPGA) or an Application Specific Integrated Circuit ASIC, or by combinations of the software and hardware components. The components may be included in a computer-readable storage medium, or some of the components may be distributed in a plurality of computers.

Accordingly, embodiments have been disclosed herein (i.e., in the drawings and the specification). Although specific terms have been used herein, they have been used merely for the purpose of describing the present disclosure, and have not been used to limit the meanings thereof and the scope of the present disclosure set forth in the claims. Therefore, it will be understood by those having ordinary knowledge in the art that various modifications and other equivalent embodiments can be made. Accordingly, the true technical protection range of this disclosure should be defined by the technical spirit of the attached claims.

DESCRIPTION OF SYMBOLS

305: object detection sensor
310: eye position detector
315: augmented reality display coordinates extractor
320: error correction module
325: graphics display unit

What is claimed is:
1. An augmented reality head-up display (HUD) display method for a vehicle, the method comprising:
  detecting, by a controller, a position of an object outside of the vehicle at which a driver of the vehicle is looking;
  detecting, by the controller, a position of an eye of the driver while the driver is viewing external object information displayed on a windshield of the vehicle;
  extracting, by the controller, augmented reality HUD display coordinates of the object based on the detected object position and augmented reality HUD display coordinates of the eye based on the detected eye position;
  correcting, by the controller, one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye based on distance information between the eye and the object, the error correction parameters varying from one another;

receiving, by the controller, the corrected augmented reality HUD display coordinates of the object and the corrected augmented reality HUD display coordinates of the eye; and displaying, by the controller, augmented reality HUD graphics of the external object information on the windshield based on the received corrected augmented reality HUD display coordinates.

2. The method of claim 1, wherein the correcting of the one or more errors comprises:

detecting a position of a plurality of objects outside of the vehicle;

setting a first correction parameter for correcting one or more errors in augmented reality HUD display coordinates of a first object of the plurality of objects and one or more errors in the augmented reality HUD display coordinates of the eye while the driver is viewing the first object; and setting a second correction parameter for correcting one or more errors in augmented reality HUD display coordinates of a second object of the plurality of objects and the augmented reality HUD display coordinates of the eye while the driver is viewing the second object, wherein the first object is an external object that is a first distance away from the eye of the driver, the second object is an external object that is a second distance away from the eye of the driver that is shorter than the first distance, and the second correction parameter is set to a lower error correction value than the first correction parameter.

3. The method of claim 1, further comprising:

detecting, by the controller, the position of the object using a radar sensor or a lidar sensor.

4. The method of claim 1, further comprising:

detecting, by the controller, the position of the eye using a camera.

5. The method of claim 1, wherein the correcting of the one or more errors comprises:

low-pass filtering the one or more errors in the augmented reality HUD display coordinates of the object and the one or more errors in the augmented reality HUD display coordinates of the eye, wherein a cut-off frequency given as a first correction parameter for the low-pass filtering is lower than a cut-off frequency given as a second correction parameter for the low-pass filtering.

6. The method of claim 1, wherein HUD display information corresponding to the external object information includes speed information of the object or navigation information of the object.

7. The method of claim 6, wherein the navigation information includes turn-by-turn (TBT) information.

8. An augmented reality HUD display device for a vehicle, the device comprising:

an object detection sensor detecting a position of an object outside of the vehicle at which a driver of the vehicle is looking;

an eye position detector detecting a position of an eye of the driver while the driver is viewing external object information displayed on a windshield of the vehicle;

an augmented reality display coordinates extractor extracting a augmented reality HUD display coordinates the object based on the detected object position and augmented reality HUD display coordinates of the eye based on the detected eye position;

an error correction module correcting one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye based on distance information between the eye and the object, the error correction parameters varying from one another; and a graphics display unit receiving, from the error correction module, the corrected augmented reality HUD display coordinates of the object and the corrected augmented reality HUD display coordinates of the eye and displaying augmented reality HUD graphics of the external object information on the windshield based on the received corrected augmented reality HUD display coordinates.

9. The device of claim 8, wherein:

the object detection sensor detects a position of a plurality of objects outside of the vehicle; and the error correction module sets a first correction parameter for correcting one or more errors in augmented reality HUD display coordinates of a first object of the plurality of objects and one or more errors in augmented reality HUD display coordinates of the eye while the driver is viewing the first object and a second correction parameter for correcting one or more errors in augmented reality HUD display coordinates of a second object of the plurality of objects and augmented reality HUD display coordinates of the eye while the driver is viewing the second object, wherein the first object is an external object that is a first distance away from the eye of the driver, the second object is an external object that is a second distance away from the eye of the driver that is shorter than the first distance, and the second correction parameter is set to a lower error correction value than the first correction parameter.

10. The device of claim 8, wherein the object detection sensor includes a radar sensor or a lidar sensor.

11. The device of claim 8, wherein the eye position detector includes a camera.

12. The device of claim 8, wherein the error correction module includes a low-pass filter, and a cut-off frequency given as a first correction parameter for the low-pass filter is lower than a cut-off frequency given as a second correction parameter for the low-pass filter.

13. The device of claim 8, wherein HUD display information corresponding to the external object information includes speed information of the object or navigation information of the object.

14. The device of claim 13, wherein the navigation information includes TBT information.

15. A non-transitory computer readable medium containing program instructions for an augmented reality HUD display method for a vehicle, the computer readable medium comprising:

program instructions that detect a position of an object outside of the vehicle at which a driver of the vehicle is looking;

program instructions that detect a position of an eye of the driver while the driver is viewing external object information displayed on a windshield of the vehicle;

program instructions that extract augmented reality HUD display coordinates of the object based on the detected object position and augmented reality HUD display coordinates of the eye based on the detected eye position;

program instructions that correct one or more errors in the augmented reality HUD display coordinates of the object and one or more errors in the augmented reality HUD display coordinates of the eye using an error correction parameter for the augmented reality HUD display coordinates of the object and an error correction parameter for the augmented reality HUD display coordinates of the eye based on distance information between the eye and the object, the error correction parameters varying from one another;

program instructions that receive the corrected augmented reality HUD display coordinates of the object and the corrected augmented reality HUD display coordinates of the eye; and program instructions that display augmented reality HUD graphics of the external object information on the windshield based on the received corrected augmented reality HUD display coordinates.

* * * * *